US006353075B1

United States Patent
Hupfield et al.

(10) Patent No.: US 6,353,075 B1
(45) Date of Patent: *Mar. 5, 2002

(54) POLYMERIZATION OF SILOXANES

(75) Inventors: Peter Hupfield, Carmarthen; Avril Surgenor, Cardiff; Richard Taylor, Barry, all of (GB)

(73) Assignee: Dow Corning Limited, Barry (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/458,245

(22) Filed: Dec. 9, 1999

(30) Foreign Application Priority Data

Sep. 12, 1998 (GB) ................................ 9827085

(51) Int. Cl.[7] ................................ C08G 77/08
(52) U.S. Cl. ................................ 528/23; 528/21; 528/37
(58) Field of Search ................................ 528/23, 37, 21

(56) References Cited

U.S. PATENT DOCUMENTS

| 4,831,174 A | * | 5/1989 | Elm |
| 5,534,608 A | * | 7/1996 | Thompson et al. |
| 5,688,888 A | | 11/1997 | Burkus et al. ............... 528/22 |
| 5,883,215 A | * | 3/1999 | Bischoff et al. |

FOREIGN PATENT DOCUMENTS

| DE | 626415 | 5/1994 | |
| DE | 19719340 | 11/1998 | ............ B01J/27/16 |
| EP | 779317 A2 | 6/1997 | |
| EP | 860461 A2 | 8/1998 | |
| GB | 2279945 | 7/1994 | |

OTHER PUBLICATIONS

Reinhard Schwesinger, et. al., "Extremely Strong, Uncharged Auxiliary Bases; Monomeric and Polymer–Supported Polyaminophosphazenes (P2–P5)", Liebigs Ann. 1996, pp. 1055–1081.

* cited by examiner

Primary Examiner—Robert Dawson
Assistant Examiner—Marc S. Zimmer
(74) Attorney, Agent, or Firm—Jennifer S. Warren

(57) ABSTRACT

A polymerization process comprising mixing a siloxane having silicon-bonded groups R' and a cyclic or linear siloxane having no silicon-bonded groups R' with a phosphazene base catalyst in the presence of water and allowing the siloxane having silicon-bonded groups R' to condense and the cyclic or linear siloxane having no silicon-bonded R' groups to polymerize by equilibration.

10 Claims, No Drawings

POLYMERIZATION OF SILOXANES

FIELD OF INVENTION

This invention relates to the polymerization of siloxanes catalyzed by certain phosphazene bases.

BACKGROUND OF INVENTION

In EP0860461-A, there is described a process for the ring-opening polymerization of cyclosiloxanes, which comprises contacting a cyclosiloxane with 1 to 500 ppm of a phosphazene base, by weight of cyclosiloxane, in the presence of water. In GB 2311994, there is described a method of effecting polycondensing which comprises contacting at a temperature of from 0 to 200° C. and a pressure up to 350 torr, a silanol-containing organosiloxane with an amount of a peralkylated phosphazene base which is effective for polycondensation of said organosiloxane. The preferred peralkylated phosphazene base has the formula

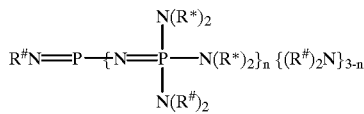

wherein $R^\#$ is a $C_{1-4}$ alkyl radical, $R^*$ is a $C_{1-10}$ alkyl radical and n is 2 or 3. GB 2279945 discloses that short chain linear acidic phosphazenes of the formulae $OCl_2P(NPCl_2)_nNPCl_2OH$, $OCl_2P(NPCl_2)_nN(H)PCl_2O$ or $OCl_2P(NPCl_2)_nNPCl_3$ as well as products of their reaction with water, alcohols and organosiloxanes are active catalysts for polycondensation and redistribution of organosiloxane polymers. U.S. Pat. No. 5,380,902 discloses a process for the condensation and/or equilibration of organosilicon compounds in the presence of oxygen-containing phosphazenes of the formula $Cl_3P=N(-PCl_2=N)_n-PCl_2O$ or $HO-PCl_2=N(-PCl_2=N)_n-PCl_2O$.

SUMMARY OF INVENTION

This invention is a process for polymerizing siloxanes comprising mixing a first siloxane having silicon-bonded groups R', wherein R' is selected from the group consisting of hydroxyl and a hydrocarbonoxy group having 1 to 8 carbon atoms, and a second siloxane having no silicon-bonded groups R' together with a phosphazene base catalyst and allowing the siloxanes to polymerize so that the siloxane having silicon-bonded groups R' condenses and the cyclic or linear siloxane having no silicon-bonded R' groups polymerizes by equilibration.

We have surprisingly found that phosphazene bases are at least as effective as catalysts for the combined polymerization via condensation and polymerization by equilibration, when carried out simultaneously. This is unexpected as there is usually a substantial difference in catalytic rate between both reactions.

The speed of polymerization via equilibration seems to be substantially faster than for the condensation reaction described in this application. It was therefore surprising to find that the same catalyst can be used for combined polymerization via condensation and equilibration by mere mixture of the siloxane materials used for condensation polymerization, with cyclic siloxanes or certain linear siloxanes as described below, which are suitable for polymerization by equilibration. The combined reaction did not seem to favor one polymerization reaction to the detriment of the other.

DETAILED DESCRIPTION OF THE INVENTION

A process according to the invention for polymerizing siloxanes using a phosphazene catalyst comprises mixing a first siloxane having silicon-bonded groups R', where R' denotes a hydroxyl group or a hydrocarbonoxy group having 1 to 8 carbon atoms, and a second siloxane, either cyclic or linear, having no silicon-bonded groups R', together with a phosphazene base catalyst and allowing the siloxane having silicon-bonded groups R' to condense and the cyclic and linear siloxanes having no silicon-bonded R' groups to polymerize by equilibration.

In principle, any non-ionic phosphazene base is suitable for use in the present invention. Phosphazene bases generally include the following core structure P=N—P=N, in which free N valencies are linked to hydrogen or hydrocarbon, i.e. form amino groups, and free P valencies are linked to amino groups.

Phosphazene bases and routes for their synthesis have been described in the literature, for example in Schwesinger et al., Liebigs Ann. 1996, 1055–1081. Some phosphazene bases are commercially available e.g. from Fluka Chemie AG, Switzerland.

The phosphazene bases preferably have at least 3 P-atoms. Preferred phosphazene bases are non-ionic phosphazenes of the following general formulae:

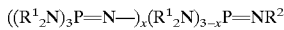

in which $R^1$, which may be the same or different in each position, is hydrogen or an optionally substituted hydrocarbon group, preferably a $C_1-C_4$ alkyl group, or in which two $R^1$ groups bonded to the same N atom may be linked to complete a heterocyclic ring, preferably a 5- or 6-membered ring; $R^2$ is hydrogen or an optionally substituted hydrocarbon group, preferably a $C_1-C_{20}$ alkyl group, more preferably a $C_1-C_{10}$ alkyl group and x is 1, 2 or 3, preferably 2 or 3. Particularly suitable compounds are those where $R^1$ is methyl, $R^2$ is tertiary butyl or tertiary octyl and x is 3.

The phosphazene base is found to be a very powerful catalyst for the polymerization, and can therefore be present in a relatively low proportion, for example from 2 to 200 ppm by weight, based on the weight of siloxanes. The proportion of catalyst actually used will be selected depending on the speed of polymerization that is sought.

The process can be carried out in the presence of water, a silanol or an alcohol, or in the absence of any of these compounds. It is surprising that there is neither any need to have water present, nor is there any need to eliminate water prior to the commencement of the polymerization. Water may be present in the reaction, preferably at least 0.5 or 1 up to 10 mols per mol of the phosphazene base. The silanol, for example a trialkyl silanol, or alcohol, for example an alkanol having 1 to 8 carbon atoms, can be used in similar amounts. It is possible to use higher proportions of water, and this can have the benefit of enabling greater control over the polymerization reaction, as described in more detail below. It is however preferred to carry out the reaction with conditions where water will be removed during the process, e.g. by working in a system which encourages a large liquid gas interface.

The polymerization can be carried out in bulk or in the presence of a solvent. Suitable solvents are liquid hydrocarbons or silicone fluids. The phosphazene base catalyst can be diluted in a hydrocarbon solvent, such as hexane or heptane, or dispersed in a silicone fluid such as polydiorganosiloxanes. Where the phosphazene base catalyst is initially in a solvent such as hexane, the hexane can be removed by evaporation under vacuum, and the catalyst dispersed in a silicone fluid to give a stable clear solution. When this silicone dissolved catalyst is used for polymerization reactions, the catalyst disperses evenly and gives reproducible results. The catalyst can also be dissolved in water, and this has the advantage of moderating and enabling greater control over the polymerization reaction, as described below.

The polymerization reaction can be carried out at ambient temperature or under heating at a temperature as high as 250° C. or even 300° C. or higher. Heating, for example to 100° C. or higher, is appropriate when the catalyst activity has been moderated as described below. The preferred temperature range may be from 50 to 170° C. The time taken for polymerization will depend on the activity of the catalyst in the chosen system, and on the desired polymer product. In the absence of moderation, the phosphazene base catalysts are sufficiently active to convert siloxanes to high molecular weight polysiloxane gums within a short time frame.

The siloxanes having silicon-bonded groups R' are for example, organosiloxanes having the general formula (3):

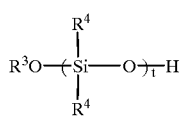

(3)

In formula (3), $R^3$ is a hydrogen or an alkyl or aryl group having up to 8 carbon atoms, each $R^4$ is the same or different and denotes a monovalent hydrocarbon group preferably having 1 to 18 carbon atoms or halogenated hydrocarbon group preferably having 1 to 18 carbon atoms and t is an integer having a value of from at least 2.

Preferably $R^4$ denotes an alkyl group having from 1 to 6 carbon atoms and more preferably a methyl group. The value of t is preferably such that the average viscosity of the polyorganosiloxanes does not exceed 200 mm²/s at 25° C.

Suitable organosiloxanes may have silicon-bonded R' groups which are in the polymer chain, but preferably these are present in end-groups. Organosiloxanes having terminal silicon-bonded hydroxyl groups are well known in the art and are commercially available. They can be made by techniques known in the art, for example, by hydrolysis of a chlorosilane, separation of the linear and cyclic material produced by the hydrolysis, and subsequently polymerizing the linear material. Preferably suitable organosiloxanes have one silicon-bonded hydroxyl group in each terminal group and have at least 80% of the $R^4$ groups denote a methyl group. Suitable organosiloxanes for use as reagents in a polymerization process in which the non-ionic phosphazene catalysts are used include organosiloxanes having terminal hydroxydiorganosiloxane units, e.g. hydroxyldimethyl siloxane end-blocked polydimethylsiloxanes, hydroxydimethyl siloxane end-blocked polydimethyl polymethylphenyl siloxane copolymers.

Suitable cyclosiloxanes, also known as a cyclic siloxanes, have the general formula $(R^2{}_2SiO)_n$, wherein $R^2$ is as defined above, and preferably denotes hydrogen or an optionally substituted alkyl, alkenyl, aryl, alkaryl or aralkyl group having up to 8 carbon atoms, n denotes an integer with a value of from 3 to 12. $R^2$ can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, butenyl and hexenyl. The aryl and aralkyl groups can be, for example, phenyl, tolyl, and benzoyl. The preferred groups are methyl, ethyl, phenyl, vinyl, and trifluoropropyl. Preferably at least 80% of all $R^2$ groups are methyl or phenyl groups, most preferably methyl. It is most preferred that substantially all $R^2$ groups are methyl groups. Preferably the value of n is from 3 to 6, most preferably 4 or 5. Examples of suitable cyclic siloxanes are octamethyl cyclotetrasiloxane, decamethyl cyclopentasiloxane, cyclopenta (methylvinyl) siloxane, cyclotetra (phenylmethyl) siloxane and cyclopenta methylhydrosiloxane. One particularly suitable commercially available material is a mixture of octamethylcyclotetrasiloxane and decamethylcyclopentasiloxane.

The starting material for equilibration polymerization can be instead of or in addition to cyclic siloxanes as described above, any organosiloxane material having units of the general formula $R^{5}{}_aSiO_{4-a/2}$ wherein $R^5$ denotes a hydrogen atom, a hydrocarbon group having from 1 to 18 carbon atoms, a substituted hydrocarbon group having from 1 to 18 carbon atoms or a hydrocarbonoxy group having up to 18 carbon atoms and a is as above defined but preferably has on average a value of from 1 to 3, preferably 1.8 to 2.2. Preferably the organosiloxanes are dialkylsiloxanes, and most preferably dimethylsiloxanes. They are preferably substantially linear materials, which are end-blocked with a siloxane group of the formula $R^5{}_3SiO_{1/2}$.

Thus the process according to the invention will be useful for making polyorganosiloxanes having units of the general formula $R''_aSiO_{4-a/2}$ (2) wherein $R''$ is hydroxyl or a hydrocarbon and a has a value of from 0 to 3. Preferably at least 80% of all $R''$ groups are alkyl or aryl groups, more preferably methyl groups. Most preferably substantially all $R''$ groups are alkyl or aryl groups, especially methyl groups. The polyorganosiloxanes are preferably those in which the value of a is 2 for practically all units, except for the end-blocking units, and the siloxanes are substantially linear polymers of the general formula $R''(R''{}_2SiO)_pSiR''{}_3$. (3) wherein $R''$ is as defined above and p is an integer. It is, however, also possible that small amounts of units wherein the value of a denotes 0 or 1 are present. Polymers with such units in the chain would have a small amount of branching. The viscosity of the polyorganosiloxanes which may be produced by the process using a catalyst according to the present invention may be in the range of from 1000 to many millions mm²/s at 25° C., depending on the reaction conditions and raw materials used in the method of the invention.

The process according to the invention can be used to make a whole range of polyorganosiloxanes, including liquid polymers and gums of high molecular weight, for example from $1\times10^6$ to $100\times10^6$ amu. The molecular weight of polyorganosiloxanes is affected by the concentration of materials used in the reaction which will provide end groups. Suitable ingredients include short chain polymers e.g. organosiloxanes having only 1 group R' and R'Si containing silanes. In the absence of added end groups providing ingredients used in the process according to the invention, the molecular weight is determined by the catalyst concentration. An ingredient providing end-blocker groups may be added in a proportion calculated to produce a desired molecular weight of polymer. Water also acts as a end-blocker, with the introduction of hydroxyl functional groups. The catalyst used in the present invention has sufficient activity to enable the formation of polymers in a reasonable time at a low catalyst concentration. Suitable end-blockers for the equilibration polymers to be formed, include polysiloxanes in the molecular weight range from 160 upwards, in particular polydimethylsiloxanes of the general formula $MD_xM$ where M is trimethylsilyl, D is —$Si(CH_3)_2O$— and x has a value of from 0 to 20. The end-blocker may have one or more functional groups such as hydroxyl, vinyl or hydrogen.

By using a combination of condensation and equilibration reactions, it is possible to arrange the reagent mixture is a way to control the end-product, for example by controlling the amount and type of ingredients which are used to cause end-blocking, by varying the ratio of siloxanes which polymerize via condensation to siloxanes which polymerize via equilibration.

When the desired polymer has been formed, it is usually desirable to neutralize the catalyst to stabilize the product and prevent any further reaction. Suitable neutralizing agents are acids such as acetic acid, silyl phosphate, polyacrylic acid chlorine substituted silanes, silyl phosphonate or carbon dioxide.

We have found that air reacts very rapidly with the catalyst solutions giving a hazy material which eventually leads to an insoluble liquid phase. This is believed to be due to the reaction of the catalyst with $CO_2$ to form a carbonate salt. We have also found that this deactivation of the catalyst can be reversed e.g. by heating, purging with inert gas or subjecting the mixture to reduced pressure. This makes it possible to moderate or control the polymerization reaction. This is particularly advantageous in view of the very rapid reaction which occurs when the catalyst is not moderated. Because of the very low levels of catalyst employed in these reactions (which can be as low as 1 to 10 ppm), the reaction with water and $CO_2$ needs to be taken into account to control the reaction and obtain reproducible results. By dissolving the phosphazene base in water, in which it is very soluble and very stable, the catalyst activity becomes much more controllable and the polymers produced are of lower molecular weight. This is caused by the water acting as a catalyst inhibitor and also as an end-blocker. The inhibiting effect of the water can be reduced by reducing the amount of water present e.g. by heating. At temperatures below 100° C. the rate of polymerization is relatively slow in the presence of water and/or $CO_2$, for example taking up to more than 24 hours to reach gum viscosity. At temperatures above 100° C. (e.g. 100–150° C.), polymerization becomes much faster, for example taking up to 5–60 minutes to reach gum viscosity. Such control of the reaction can also be achieved if the water is mixed with or replaced by alcohol (e.g. $C_1$–$C_6$ alcohols such as methanol or ethanol).

We have also found that polymerization can be prevented by exposing a mixture of cyclosiloxane and phosphazene base catalyst to air and/or $CO_2$ or to larger amounts of water. The polymerization can then be initiated ("command polymerization") simply by removing the air and/or $CO_2$ or the water e.g. by heating the mixture (e.g. to 100° C. to 170° C. for a few minutes). A mixture of octamethylcyclotetrasiloxane with 2 to 50 ppm of catalyst is stable in air at 20° C. for extended periods (up to 7 days).

Thermogravimetric analysis of the polymers produced according to the invention shows that they have enhanced thermal stability. High molecular weight gums have been produced with decomposition onset temperatures of more than 450° C., and silicone fluids have been produced with decomposition onset temperatures of more than 500° C. The enhanced thermal stability is attributed to the very low levels of catalyst residues remaining in the product. The low catalyst residues also mean that a filtration step is usually not necessary, which is a very significant process advantage.

EXAMPLES

The following Examples illustrate the invention. Unless stated otherwise, all parts and percentages are by weight and all viscosities are given at 25° C.

Example 1

Silanol end-blocked polydimethylsiloxane having a viscosity of 60 $mm^2/s$ (120.5 g), octamethylcyclotetrasiloxane (177.2 g) and a polydimethylsiloxane end-blocker having a viscosity of 5 $mm^2/s$ (12.2 g) were mixed together in a reaction vessel and 1-tert-Butyl-4,4,4-tris(dimethylamino)-2,2-bis(tris(dimethylamino)-phosphoranylidenamino)-$2\lambda^5$,$4\lambda^5$-catenadi(phosphazene)) (50 ppm) was added. The reaction mixture was heated to 100° C. at a reduced pressure of 150 mbar and held for 2.5 hours. The reaction mixture was allowed to cool and was neutralized with excess bis-(dimethylvinylsilyl) vinyl phosphonate. After stripping at 145° C. for 1 hour the final product had viscosity 1831 $mm^2/s$, and a non-volatile content of 97.1%.

Example 2

A 50/50 mixture of silanol end-blocked polydimethylsiloxane and cyclodimethylsiloxane having a viscosity of 14 $mm^2/s$ (96.1 g) and a polydimethylsiloxane end-blocker with a viscosity of 5 $mm^2/s$ (3.9 g) were mixed together in a reaction vessel and the reaction mixture heated to 100° C. under a reduced pressure of 150 mbar. At that temperature 1-tert-Butyl-4,4,4-tris(dimethylamino)-2,2-bis(tris(dimethylamino)-phosphoranylidenamino)-$2\lambda^5$,$4\lambda^5$-catenadi(phosphazene)) (150 ppm) was added. After 5 hours the reaction was allowed to cool and was neutralized with excess bis-(dimethylvinylsilyl) vinyl phosphonate prior to stripping for 1 hour at 145° C. The final product had a viscosity of 863.5 $mm^2/s$ and a non-volatile content of 98.0%.

Example 3

A 50/50 mixture of silanol end-blocked polydimethylsiloxane and cyclodimethylsiloxane having a viscosity of 14 $mm^2/s$ (85.6 g), octamethylcyclotetrasiloxane (13.1 g) and a hexamethyldisiloxane end-blocker (1.4 g) were mixed together in a reaction vessel and the reaction mixture heated to 100° C. at atmospheric pressure. At that temperature 1-tert-Butyl-4,4,4-tris(dimethylamino)-2,2-bis(tris(dimethylamino)-phosphoranylidenamino)-$2\lambda^5$,$4\lambda^5$-catenadi(phosphazene)) (150 ppm) was added. After 1 hour the reaction mixture was allowed to cool and the mixture was neutralized with excess bis-(dimethylvinylsilyl) vinylphosphonate prior to stripping for 1 hour at 145° C. The final product had a viscosity of 747 $mm^2/s$ and a non-volatile content of 98.0%.

Example 4

A 50/50 mixture of silanol end-blocked polydimethylsiloxane and cyclodimethylsiloxane having a viscosity of 14 $mm^2/s$ (95 g), and a hexamethyldisiloxane end-blocker (5 g) were mixed together in a reaction vessel and the reaction mixture heated to 100° C. at atmospheric pressure. At that temperature 1-tert-Butyl-4,4,4-tris(dimethylamino)-2,2-bis[tris(dimethylamino)-phosphoranylidenamino]-$2\lambda^5$,$4\lambda^5$-catenadi(phosphazene)], (150 ppm) was added. After 1 hour the reaction mixture was allowed to cool and the mixture was neutralized with excess bis-(dimethylvinylsilyl) vinyl phosphonate prior to stripping for 1 hour at 145° C. The final product had viscosity 91 $mm^2/s$ and a non-volatile content of 98.0%.

Example 5

A 50/50 mixture of silanol end-blocked polydimethylsiloxane and cyclodimethylsiloxane having a viscosity of 14 mm²/s (90 g), and a hexamethyldisiloxane end-blocker (10 g) were mixed together in a reaction vessel and the reaction mixture heated to 100° C. at atmospheric pressure. At that temperature 1-tert-Butyl-4,4,4-tris(dimethylamino)-2,2-bis (tris(dimethylamino)-phosphoranylidenamino)-2λ⁵,4λ⁵-catenadi(phosphazene)), (150 ppm) was added. After 1 hour the reaction mixture was allowed to cool and it was neutralized with excess bis-(dimethylvinylsilyl) vinylphosphonate prior to stripping for 1 hour at 145° C. The final product had a viscosity of 39 mm²/s and a non-volatile content of 95.0%.

Example 6

Silanol end-blocked polydimethylsiloxane having a viscosity of 60 mm²/s (83.4 g), a mixture of low boiling silanol end-blocked polydimethylsiloxane and cyclodimethylsiloxanes, (12.7 g) and a polydimethylsiloxane end-blocker having a viscosity of 5 mm²/s (3.9 g) were mixed together in a reaction vessel and the reaction mixture was heated to 100° C. under reduced pressure of 200 mbar. At that temperature 1-tert-Butyl-4,4,4-tris(dimethylamino)-2,2-bis(tris(dimethylamino)-phosphoranylidenamino)-2λ⁵, 4λ⁵-catenadi(phosphazene)) (150 ppm) was added. After 15 minutes a neutralization agent bis-(dimethylvinylsilyl) vinylphosphonate, was added in excess. After stripping at 145° C. for 1 hour the final product had viscosity 2891 mm²/s and a non-volatile content of 97%.

Example 7

Silanol end-blocked polydimethylsiloxane having a viscosity of 60 mm²/s (83.4 g), a mixture of low boiling silanol end-blocked polydimethylsiloxane and cyclodimethylsiloxanes, (12.8 g) and a polydimethylsiloxane end-blocker having a viscosity of 5 mm²/s (3.9 g) were mixed together in a reaction vessel and the reaction mixture was heated to 130° C. under reduced pressure of 400 mbar. At that temperature, 1-tert-Butyl-4,4,4-tris(dimethylamino)-2,2-bis(tris(dimethylamino)-phosphoranylidenamino)-2λ⁵, 4λ⁵-catenadi(phosphazene)), (150 ppm) was added. After 5 minutes a neutralization agent bis-(dimethylvinylsilyl) vinylphosphonate, was added in excess. After stripping at 145° C. for 1 hour the final product had viscosity 309 mm²/s and a non-volatile content of 95%.

Example 8

A 74/26 mixture of silanol end-blocked polydimethylsiloxane and cyclodimethylsiloxanes (95 g), and a polydimethylsiloxane end-blocker having a viscosity of 10 mm²/s (5 g) were mixed together in a reaction vessel and the reaction mixture was heated to 134° C. under reduced pressure of 500 mbar. At that temperature, 1-tert-Butyl-4,4,4-tris (dimethylamino)-2,2-bis(tris(dimethylamino)-phosphoranylidenamino)-2λ⁵,4λ⁵-catenadi(phosphazene)), (65 ppm) was added. After 5 minutes a neutralization agent bis-(dimethylvinylsilyl) vinylphosphonate, was added in excess. After stripping at 165° C. for 1 hour the final product had viscosity 448 mm²/s and a non-volatile content of 98%.

Example 9

The process of Example 8 was repeated using a temperature and time of reaction of 130° C. and 30 minutes.λ⁵,4λ⁵. After stripping at 145° C. for 1 hour the final product had viscosity 1207 mm²/s and a non-volatile content of 99%.

Example 10

A 26/74 mixture of silanol end-blocked polydimethylsiloxane and cyclodimethylsiloxanes (95 g), and a polydimethylsiloxane end-blocker having a viscosity of 10 mm²/s (5 g) were mixed together in a reaction vessel and the reaction mixture was heated to 135° C. under atmospheric pressure. At that temperature, 1-tert-Butyl-4,4,4-tris(dimethylamino)-2,2-bis(tris(dimethylamino)-phosphoranylidenamino)-2λ⁵, 4λ⁵-catenadi(phosphazene)), (150 ppm) was added. After 15 minutes a neutralization agent bis-(dimethylvinylsilyl) vinylphosphonate, was added in excess. After stripping at 145° C. for 1 hour the final product had viscosity 932 mm²/s and a non-volatile content of 98.4%.

That which is claimed is:

1. A process for polymerizing siloxanes comprising mixing a first siloxane having silicon-bonded groups R', wherein R' is selected from the group consisting of hydroxyl and a hydrocarbonoxy group having 1 to 8 carbon atoms, a second siloxane having no silicon-bonded groups R', together with a phosphazene base catalyst, and allowing the siloxanes to polymerize so that the siloxane having silicon-bonded groups R' condenses and the cyclic or linear siloxane having no silicon-bonded R' groups polymerizes by equilibration.

2. A process according to claim 1, wherein the siloxanes and catalyst are mixed in the presence of a hydroxyl-containing component selected from water, a silanol, and an alcohol.

3. A process according to claim 2, wherein the hydroxyl containing component is water present in the amount of from about 0.5–10 mols per mol of the non-ionic phosphazene base.

4. A process according to claim 1, wherein the phosphazene base has the following general formula:

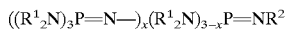

in which R¹, which may be the same or different in each position, is selected from the group consisting of hydrogen, hydrocarbon groups and substituted hydrocarbon groups, or in which two R¹ groups bonded to the same N atom may be linked to complete a heterocyclic ring, R² is selected from the group consisting of hydrogen, hydrocarbon groups and substituted hydrocarbon groups and x is 1 to 3.

5. A process according to claim 1, wherein the siloxanes and catalyst are mixed in the presence of a solvent selected from liquid hydrocarbons and silicone fluids.

6. A process according to claim 1, wherein the siloxane having silicon-bonded R' groups is an organosiloxane having the general formula

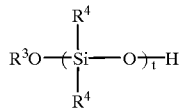

wherein R³ is selected from the group consisting of hydrogen and alkyl or aryl groups having 1 to 8 carbon atoms, each R⁴ is selected from monovalent hydrocarbon groups having 1 to 18 carbon atoms and halogenated hydrocarbon groups having 1 to 18 carbon atoms and t is an integer having a value of at least 2.

7. A process according to claim 1, wherein the siloxanes and catalyst are mixed with an end-blocker, selected from organosiloxanes having only one group R', silanes containing a group of the formula R'Si and polydimethylsiloxanes of the general formula MD$_x$M where M is trimethylsilyl, D is —Si(CH₃)₂O— and x has a value of from 0 to 20.

8. A process according to claim 1, further comprising stopping the polymerization by neutralizing the catalyst with a neutralizing agent selected from acetic acid, silyl phosphate, polyacrylic acid, chlorine substituted silanes, silyl phosphonate and carbon dioxide.

9. A process according to claim 1, wherein the second siloxane is a cyclic siloxane having the general formula $(R^2{}_2SiO)_n$, wherein $R^2$ is selected from hydrogen and optionally substituted hydrocarbon groups and n has a value of from 3 to 12.

10. A process according to claim 1, wherein the second siloxane is a linear organosiloxane having units of the general formula $R^5{}_aSiO_{4-a/2}$ wherein $R^5$ is selected from hydrogen, hydrocarbon groups having 1 to 18 carbon atoms, and substituted hydrocarbon groups having 1 to 18 carbon, and a has a value of from 0 to 3.

* * * * *